(12) United States Patent
Zhu et al.

(10) Patent No.: US 11,805,037 B2
(45) Date of Patent: Oct. 31, 2023

(54) LATENCY ADJUSTMENT METHOD AND DATA STREAM PROCESSING DEVICE

(71) Applicant: REALTEK SEMICONDUCTOR CORPORATION, Hsinchu (TW)

(72) Inventors: Cheng-Zhuo Zhu, Suzhou (CN); Chia Chun Hung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/706,649

(22) Filed: Mar. 29, 2022

(65) Prior Publication Data
US 2022/0321442 A1    Oct. 6, 2022

(30) Foreign Application Priority Data

Mar. 31, 2021  (CN) .......................... 202110351638.X

(51) Int. Cl.
*H04L 43/0829* (2022.01)
*H04L 43/18* (2022.01)
*H04L 43/16* (2022.01)
*H04L 43/0852* (2022.01)

(52) U.S. Cl.
CPC ...... *H04L 43/0829* (2013.01); *H04L 43/0858* (2013.01); *H04L 43/16* (2013.01); *H04L 43/18* (2013.01)

(58) Field of Classification Search
None
See application file for complete search history.

(56) References Cited

U.S. PATENT DOCUMENTS

| 6,862,298 | B1  |    | 3/2005  | Smith et al.              |
|-----------|-----|----|---------|---------------------------|
| 11,115,693| B2  | *  | 9/2021  | Ryan ............... H04N 21/23805 |
| 2011/0060831 | A1 | * | 3/2011 | Ishii ................. H04L 43/12 709/224 |
| 2013/0250938 | A1 |   | 9/2013 | Anandakumar et al.        |
| 2014/0269326 | A1 | * | 9/2014 | Westin ............... H04L 47/24 370/237 |
| 2020/0213372 | A1 | * | 7/2020 | Chen ................. H04L 65/764 |
| 2020/0314469 | A1 | * | 10/2020| Ryan .................. H04N 21/242 |
| 2021/0227013 | A1 | * | 7/2021 | Bhat ................. H04N 21/23439 |

OTHER PUBLICATIONS

OA letter of a counterpart TW application (appl. No. 110112390) dated Aug. 9, 2022.

* cited by examiner

*Primary Examiner* — Ranodhi Serrao
(74) *Attorney, Agent, or Firm* — WPAT, P.C

(57) ABSTRACT

A latency adjustment method includes the following operations: in response to a predetermined event of a data stream occurred during a first interval, performing a transmission status determining operation to determine whether a transmission status of the data stream is stable; in response the transmission status being stable, determining whether a total number of times of packet loss compensation events of the data stream occurred during a previous interval is higher than a first predetermined value; and in response to the transmission status being unstable or the total number of times being higher than the first predetermined value, increasing a latency of the data stream.

17 Claims, 5 Drawing Sheets

LATENCY ADJUSTMENT METHOD AND DATA STREAM PROCESSING DEVICE

BACKGROUND OF THE INVENTION

1. Field of the Invention

The present disclosure relates to a data stream processing device. More particularly, the present disclosure relates to a data stream processing device able to dynamically adjust a latency of a data stream and a latency adjustment method.

2. Description of Related Art

In practical applications, a receiver end cannot receive data immediately due to interference. To ensure the smoothness of the final output data stream, the receiver end usually stores data for a period of time and adds latency to the output data stream. In some related approaches, this latency is set to be a large value to ensure stable transmission, but such setting is not suitable for applications that value immediacy (e.g., online gaming industry). However, if the latency is directly set to be a small value, the data stream is easy to stall due to the influence of interference.

SUMMARY OF THE INVENTION

In some aspects, a latency adjustment method includes the following operations: in response to a predetermined event of a data stream occurred during a first interval, performing a transmission status determining operation to determine whether a transmission status of the data stream is stable; in response the transmission status being stable, determining whether a total number of times of packet loss compensation events of the data stream occurred during a previous interval is higher than a first predetermined value; and in response to the transmission status being unstable or the total number of times being higher than the first predetermined value, increasing a latency of the data stream.

In some aspects, a data stream processing device includes a memory circuit and a processor circuit. The memory circuit is configured to store at least one program code. The processor circuit is configured to execute the at least one program code in the memory circuit to: in response to a predetermined event of a data stream occurred during a first interval, perform a transmission status determining operation to determine whether a transmission status of the data stream is stable; in response the transmission status being stable, determine whether a total number of times of packet loss compensation events of the data stream occurred during a previous interval is higher than a first predetermined value; and in response to the transmission status being unstable or the total number of times being higher than the first predetermined value, increase a latency of the data stream.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1A:
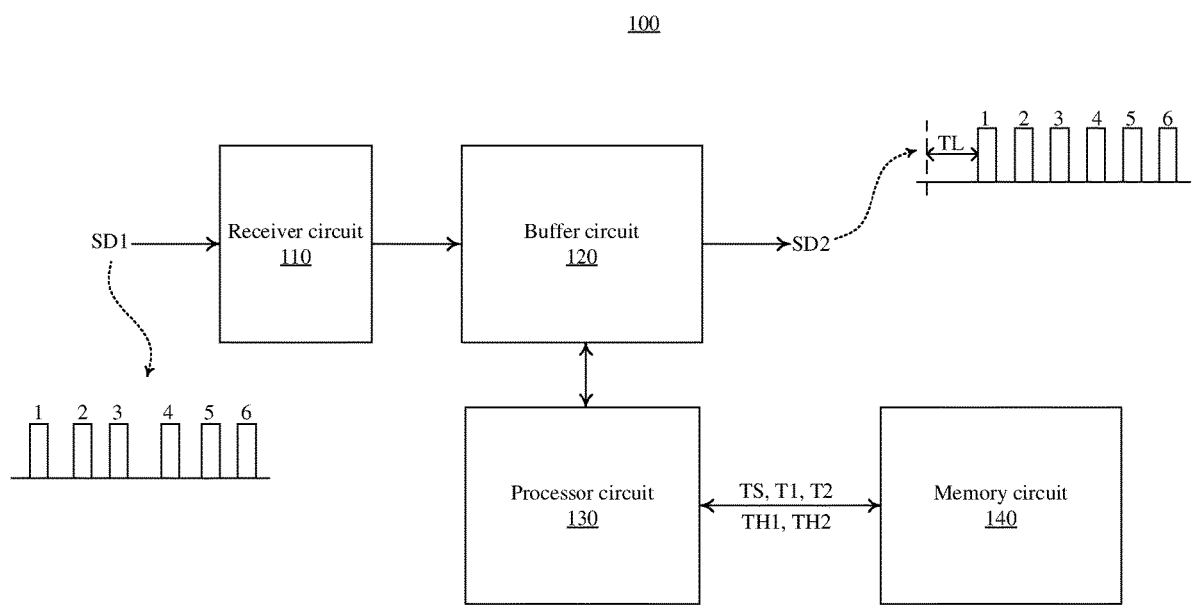
FIG. 1A is a schematic diagram of a data stream processing device according to some embodiments of the present disclosure.

FIG. 1A is a schematic diagram of a data stream processing device 100 according to some embodiments of the present disclosure. In some embodiments, the data stream processing device 100 may be, but not limited to, an audio player device. For example, a data stream SD1 may include multiple sound data, and the data stream processing device 100 may be a general headphone, a wireless headphone, or other electronic device able to play audio.

In some embodiments, the data stream processing device 100 includes a receiver circuit 110, a buffer circuit 120, a processor circuit 130, and a memory circuit 140. The receiver circuit 110 may receive the data stream SD1 from an external signal source (not shown). The buffer circuit 120 is configured to temporarily store the data stream SD1. The processor circuit 130 may be configured to perform operations in FIG. 2, FIG. 3A, and/or FIG. 3B, in order to adjust a latency of the data stream SD1 temporarily stored in the buffer circuit 120 to generate a data stream SD2.

For example, the data stream SD1 includes data 1-6. The processor circuit 130 may adjust time difference among the data 1-6 and/or insert a latency TL prior to the data 1-6 according to a current transmission environment, in order to output the data stream SD2. In some embodiments, the latency TL may be located between any two data in the data 1-6. The location of the latency TL shown is given for illustrative purposes only, and the present disclosure is not limited thereto. In some embodiments, the processor circuit 130 may perform a packet loss compensation (PLC) to adjust the latency TL. When a PLC event occurs, the processor circuit 130 stores the current data to the memory circuit 140, and the processor circuit 130 may insert the data stored in the memory circuit 140 to the buffer circuit 120 to adjust the latency TL, in order to generate the data stream SD2. Alternatively, in other examples, the processor circuit 130 may remove at least one data from the data stream SD1 to adjust the latency TL.

In different embodiments, the processor circuit 130 may include, but not limited to, one or more circuits of a central processing unit (CPU), an application-specific integrated circuit, a microcontroller unit, a digital signal processor circuit, and/or a distributed processing system. Various circuits or units to implement the processor circuit 130 are within the contemplated scope of the present disclosure.

The memory circuit 140 stores at least one program code, which is configured to adjust the latency TL. In some embodiments, the processor circuit 130 may execute the at least one program code stored in the memory circuit 140, in order to perform operations in FIG. 2, FIG. 3A, and/or FIG. 3B. In some embodiments, one or more operations in FIG. 2, FIG. 3A, and/or FIG. 3B may be implemented with software (e.g., program code, instruction set(s), and so on). In some embodiments, the memory circuit 140 includes at least one storage circuit which is configured to store information about a time stamp TS, a predetermined value TH1, a predetermined value TH2, a timer T1, a timer T2, and so on. The processor circuit 130 may utilize such information to perform operations in FIG. 2, FIG. 3A, and/or FIG. 3B. For example, when a specific condition is established, the processor circuit 130 may perform certain software or program code(s) to setup the timer T1 in the memory circuit 140, in order to start counting (i.e., timing) for a predetermined interval (hereinafter referred to as "predetermined interval PT1"). Alternatively, when a specific condition is established, the processor circuit 130 may delete (e.g., disable or clear) the timer T1 in the memory circuit 140, in order to stop counting for the predetermined interval PT1.

In some embodiments, the memory circuit 140 may be a non-transitory computer readable storage medium. In some embodiments, the computer readable storage medium may be, but not limited to, an electronic, magnetic, optical, electromagnetic, infrared, and/or a semiconductor device. For example, the computer readable storage medium includes a semiconductor or solid-state memory, a magnetic tape, a removable computer diskette, a random-access memory (RAM), a read-only memory (ROM), a rigid magnetic disk, and/or an optical disk. In some embodiments, the optical disk may include, but not limited to, CD-ROM, CD-R/W, and/or DVD.

Figure 1B:
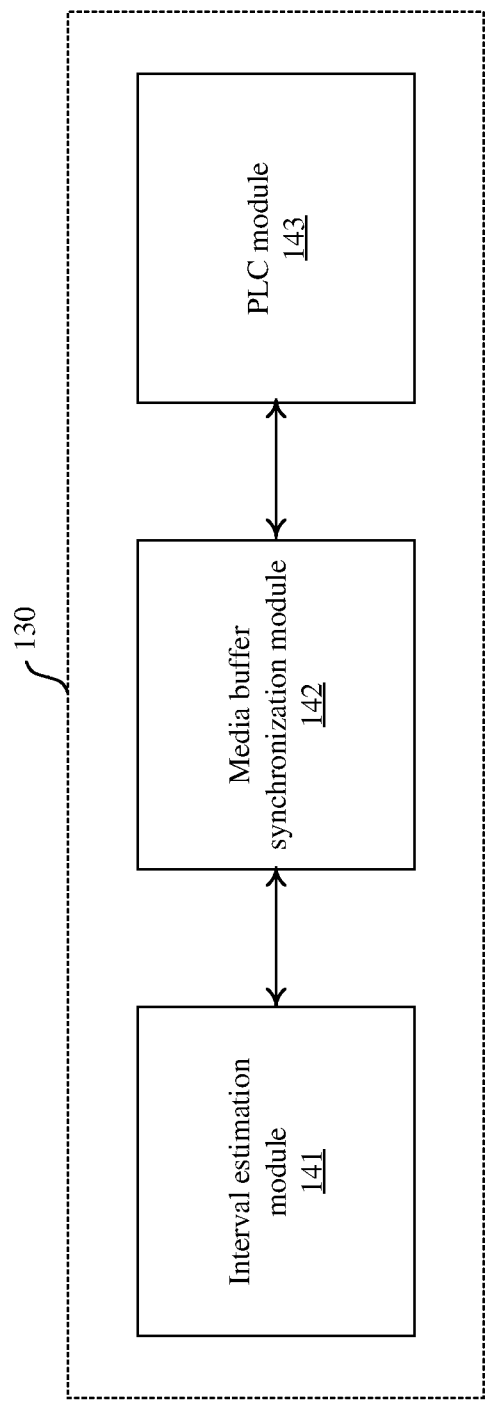
FIG. 1B is a schematic diagram of the processor circuit in FIG. 1A according to some embodiments of the present disclosure.

FIG. 1B is a schematic diagram of the processor circuit 130 in FIG. 1A according to some embodiments of the present disclosure. In this example, the data stream processing device 100 may be applied to, but not limited to, a real wireless stereo (RWS) headphone. The processor circuit 130 includes an interval estimation module 141, a media buffer synchronization module 142, and a PLC module 143. The interval estimation module 141 may be configured to perform operations in FIG. 2, in order estimate whether a transmission status of the data stream SD1 is stable. The media buffer synchronization module 142 is configured to ensure that data streams generated from two headphones have the same data amount. The PLC module 143 is configured to perform the above PLC operations. The PLC module 143 may duplicate the previous data or perform certain DSP operation(s) according to characteristics of the data stream SD1 under a condition where the data amount of the data stream SD1 is less, in order to generate sufficient data amount to keep the data stream SD2.

The modules in FIG. 1B may be implemented with hardware (which may include, but not limited to, integrated circuit(s)), software, or both of hardware and software. For example in some embodiments, functions of the interval estimation module 141 and the media buffer synchronization module 142 may be implemented with certain program codes stored in the memory circuit 140, and the PLC module 143 may be implemented with a digital signal processor (DSP) circuit, but the present disclosure is not limited thereto.

Figure 2:
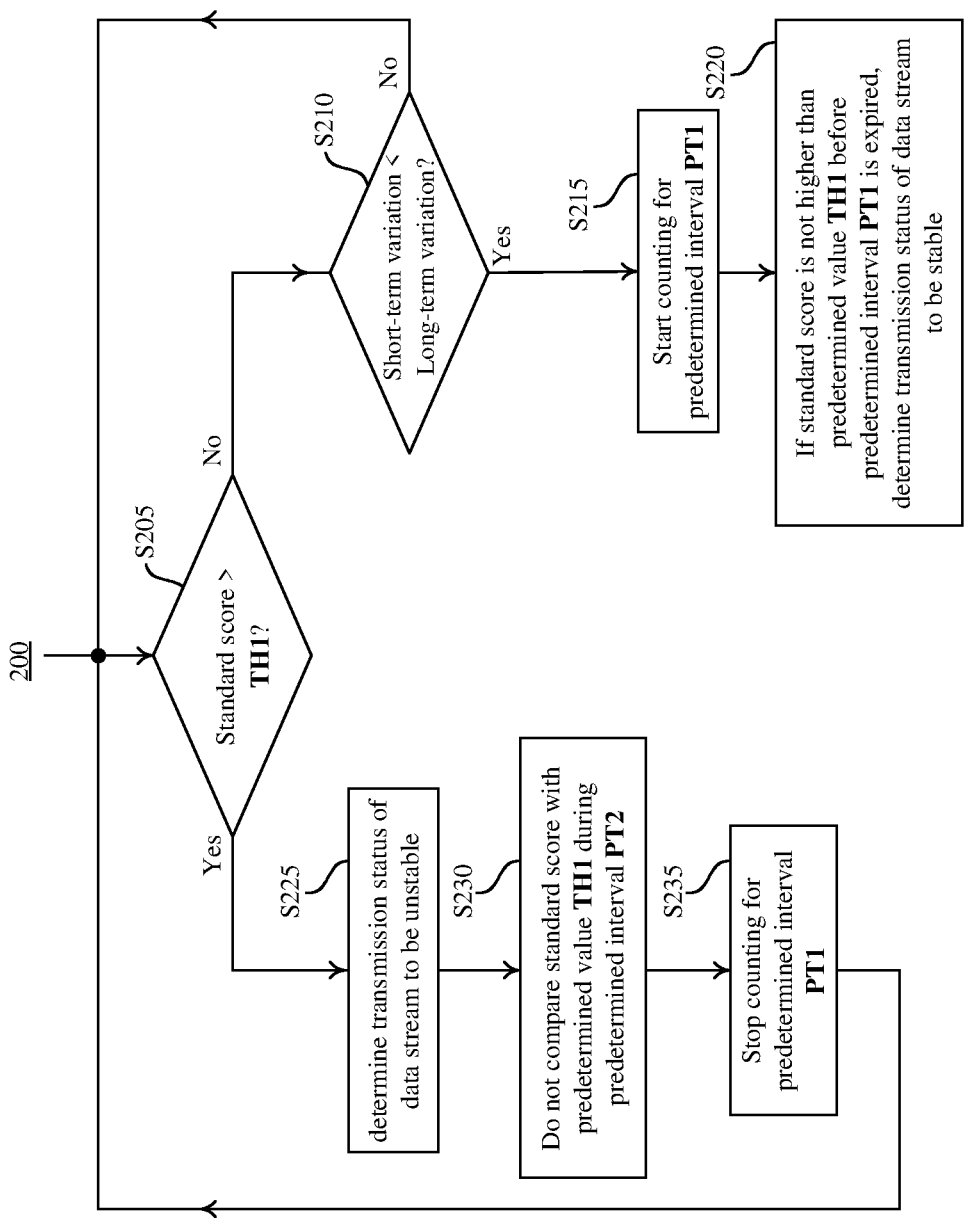
FIG. 2 is a flow chart of a method for monitoring a transmission status according to some embodiments of the present disclosure.

FIG. 2 is a flow chart of a method 200 for monitoring a transmission status according to some embodiments of the present disclosure. In some embodiments, the processor circuit 130 in FIG. 1 may execute operations (which may be referred to as a "transmission status determining operation") in FIG. 2 to estimate whether the transmission status of the data stream SD1 is stable.

In operation S205, a standard score of the data stream is compared with a predetermined value TH1. For example, when the receiver circuit 110 receives one data in the data stream SD1, the processor circuit 130 stores the timestamp TS associated with that data to the memory circuit 140. The timestamp TS is to indicate when the data is received. As a result, the processor circuit 130 may analyze a time difference between two successive data according to the timestamp TS corresponding to each data in the data stream SD1, in order to determine the standard score (also known as z-score) of the data stream SD1. The standard score is to evaluate a difference between a time difference between the two most recent data in the data stream and the average of all time differences by using the standard deviation. In other words, if the current standard score is higher, it indicates that the current transmission status of the data stream SD1 is more unstable (compared with the overall transmission status).

In operation S210, if the standard score is not higher than the predetermined value TH1, whether a short-term variation of the data stream is lower than a long-term variation the data stream is determined. In some embodiments, a number of data covered by the short-term variation is less than a number of data covered by the long-term variation. For example, the processor circuit 130 may determine time differences among multiple data (which may be, but not limited to, 16 data) which are recently received by the receiver circuit 110 according to the timestamp TS corresponding to those data. As a result, the processor circuit 130 may utilize the time differences among the multiple data to calculate the short-term variation. Similarly, the processor circuit 130 may determine time differences among all data that are currently received by the receiver circuit 110 according to the timestamp TS corresponding to those data, and utilize those time differences to calculate the long-term variation.

In operation S215, if the short-term variation is less than the long-term variation, a timer for a predetermined interval PT1 is enabled (i.e., start counting for the predetermined interval PT1). Alternatively, if the short-term variation is not less than the long-term variation, operation S205 is performed again. In operation S220, if the standard score is not higher than the predetermined value TH1 before the predetermined interval PT1 is expired, the transmission status of the data stream is determined to be stable, and operation S210 is performed again. If the short-term variation is less than the long-term variation, it indicates that the recent transmission status of the data stream SD1 is better than the previous overall transmission status of the data stream SD1. Accordingly, the processor circuit 130 may setup the timer T1 in the memory circuit 140, in order to start counting for the predetermined interval PT1. If the processor circuit 130 does not detect that the standard score of the data stream SD1 is higher than the predetermined value TH1 before the predetermined interval PT1 is expired, the processor circuit 130 may determine that the current transmission status is stable. Alternatively, if the short-term variation is not lower than the long-term variation, the processor circuit 130 may perform operation S205, in order to determine whether the standard score is higher than the predetermined value TH1 again.

In operation S225, if the standard score is higher than the predetermined value TH1, the transmission status of the data stream is determined to be unstable. In operation S230, the standard score is not compared with the predetermined value TH1 during a predetermined interval (hereinafter referred to as "predetermined interval PT2"). In operation S235, a timer for an interval (which may be equal to or different from the predetermined interval PT1, and is described as "predetermined interval PT1" in FIG. 2 for illustrative purposes) is disabled (i.e., stop counting for the predetermined interval PT1), and operation S205 is performed again.

For example, if the standard score is higher than the predetermined value TH1, it indicates the time difference between the recent two data in the data stream SD1 is too high. Under this condition, the processor circuit 130 may determine that the transmission status of the data stream SD1 is unstable. In response to the unstable transmission status, the processor circuit 130 may not to compare the standard score with the predetermined value TH1 (i.e., not to perform operation S205) within the next predetermined interval PT2 (which may be, but not limited to, 100 ms). Under this condition, if the memory circuit 140 stores the timer T1, the processor circuit 130 may delete the timer T1 to stop counting for the predetermined interval PT1 (or delete a timer different from the timer T1 to stop counting for the aforementioned interval different from the predetermined interval PT1), and perform operation S205 again.

The above description of the method 200 for monitoring the transmission status includes exemplary operations, but the operations of the method 200 for monitoring the transmission status are not necessarily performed in the order described above. Operations of the method 200 for monitoring the transmission status can be added, replaced, changed order, and/or eliminated, or the operations of the method 200 for monitoring the transmission status can be executed simultaneously or partially simultaneously as appropriate, in accordance with the spirit and scope of various embodiments of the present disclosure.

Figure 3A:
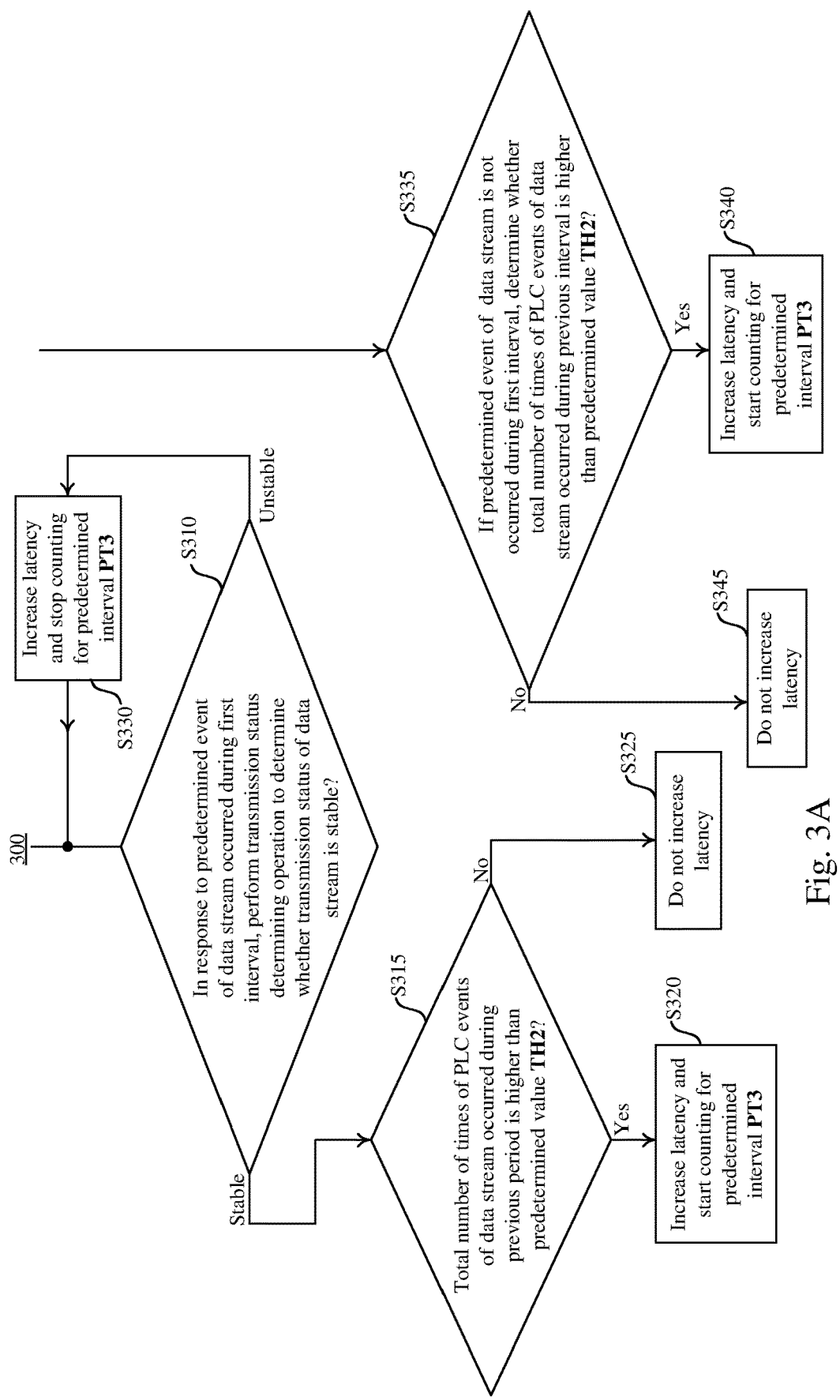
FIG. 3A and FIG. 3B illustrate a flow chart of a latency adjustment method according to some embodiments of the present disclosure.
Figure 3B:
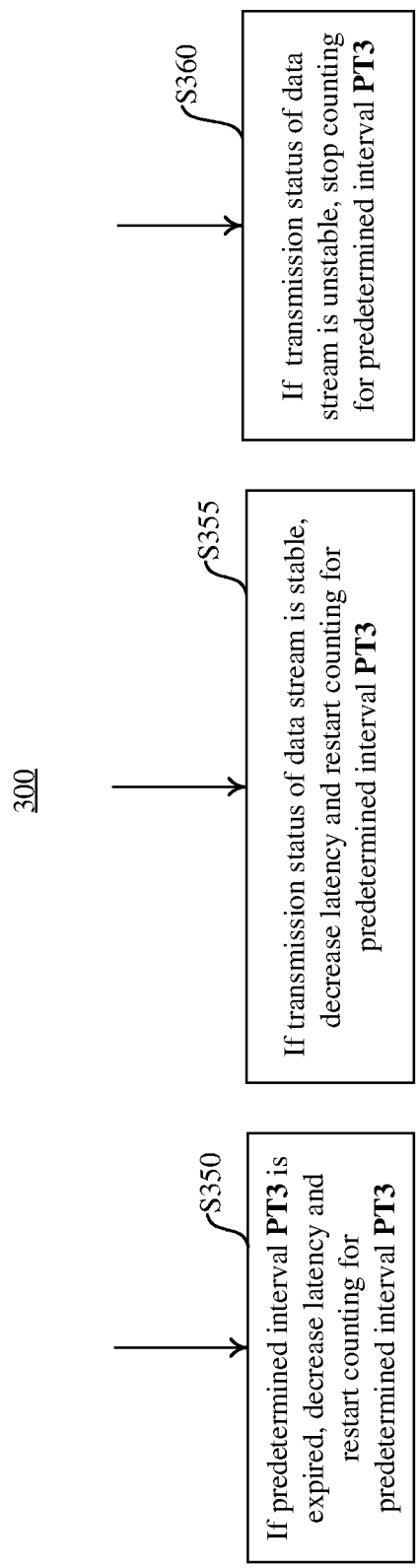

FIG. 3A and FIG. 3B illustrate a flow chart of a latency adjustment method 300 according to some embodiments of the present disclosure. In some embodiments, the latency adjustment method 300 may be (but not limited to) performed by the processor circuit 130 in FIG. 1. The latency adjustment method 300 includes operations for increasing the latency shown in FIG. 3A and operations for decreasing the latency shown in FIG. 3B. In some embodiments, the method 200 for monitoring the transmission status in FIG. 2 and the latency adjustment method 300 shown in FIG. 3A and FIG. 3B may be executed simultaneously or partially simultaneously.

Reference is made to FIG. 3A, in operation S310, in response to a predetermined event of the data stream occurred during a first interval, the transmission status determining operation is performed to determine whether the transmission status of the data stream is stable. In some embodiments, the predetermined event may include, but not limited to, a predetermined number of PLC events, in which the predetermined number may be equal to or higher than 1. The predetermined number is set to 2 for illustrative purposes in this embodiment. When a first PLC event of the data stream SD1 is occurred, the processor circuit 130 may determine whether the data stream SD1 has another PLC event within the first interval (which may be, but not limited to, about 300 ms) after the first PLC event the data stream SD1. If the data stream SD1 has a second PLC event within the first interval, the processor circuit 130 may utilize operations in FIG. 2 to determine whether the transmission status of the data stream SD1 is stable.

In operation S315, in response to the stable transmission status, whether a total number of times of PLC events of the data stream occurred during a previous interval is higher than the predetermined value TH2 is determined. If the total number of times of PLC events of the data stream SD1 occurred during the previous interval is higher than the predetermined value TH2, operation S320 is performed. Alternatively, if the total number of times of PLC events of the data stream SD1 occurred during the previous interval is not higher than the predetermined value TH2, operation S325 is performed. In operation S320, the latency is increased, and a timer for a predetermined interval (hereinafter referred to as "predetermined interval PT3") is enabled (i.e., start counting for the predetermined interval PT3). In operation S325, the latency is not increased.

For example, whenever the processor circuit 130 performs the PLC to the data stream SD1, the processor circuit 130 may record information about the number of times for performing the PLC to the memory circuit 140. If the processor circuit 130 determines that the transmissions status of the data stream SD1 is stable, processor circuit 130 may determine whether the total number of times for performing the PLC operations during the previous interval is higher than the predetermined value TH2 (which may be, but not limited to, 3 or 5). In some embodiments, the previous interval may be a predetermined interval before the execution of operation S315. In some embodiments, the previous interval may be set by one or more timers. In some embodiments, the previous interval may be an interval between the data stream processing device 100 beginning to receive the data stream SD1 and the execution of operation S315. If the total number of times of PLC events of the data stream SD1 occurred during the previous interval is higher than the predetermined value TH2, it indicates that the transmission ability of the external signal source may be poor. For example, a predetermined transmission interval of certain signal sources may be longer, such that the processor circuit 130 determines that the transmission status of the data stream SD1 is stable in operation S310. However, in practical applications, in order to compensate the longer transmission interval, the processor circuit 130 may perform a number of PLC operations to avoid data interruption in the data stream SD2. In order to identify such external signal sources, in response to the total number of times higher than the predetermined value TH2 (i.e., if the total number of times of PLC events of the data stream SD1 occurred during the previous interval is higher than the predetermined value TH2), the processor circuit 130 may keep the data utilized in the PLC operation, in order to increase the latency TL. Afterwards, the processor circuit 130 may setup the timer T2 in the memory circuit 140, in order to start counting for the predetermined interval PT3 (which may be, but not limited to, 10 seconds). Alternatively, in response to the total number of times not higher than the predetermined value TH2, the processor circuit 130 may delete the follow-up data in the data stream SD1, in order not to increase the latency TL.

In operation S330, in response to the unstable transmission status, the latency of the data stream is increased, and the timer for the predetermined interval PT3 is disabled (i.e., stop counting for the predetermined interval PT3), in order to perform operation S310 again. For example, if the processor circuit 130 utilizes operations in FIG. 2 to determine that the transmission status of the data stream SD1 is unstable, the processor circuit 130 may keep the data utilized in the PLC operations, in order to increase the latency TL. Afterwards, the processor circuit 130 checks whether the memory circuit 140 stores the timer T2. If the memory circuit 140 stores the timer T2, the processor circuit 130 may delete the timer T2 to stop counting for the predetermined interval PT3, and perform operation S310 again. As a result, if the transmission status of the data stream SD1 keeps being poor, the processor circuit 130 is able to utilize the above operations to dynamically increase the latency TL.

In operation S335, if the predetermined event of the data stream is not occurred during the first interval, whether the total number of times of PLC events of the data stream occurred during the previous interval is higher than a value (which may be equal to or different from the predetermined value TH2, and is described as "predetermined value TH2" in FIG. 3A for illustrative purposes)" is determined. In operation S340, the latency is increased, and the timer for the predetermined interval PT3 is enabled (i.e., start counting for the predetermined interval PT3). In operation S345, the latency is not increased. Similar to operation S315 to operation S325, if the predetermined event of the data stream SD1 is not occurred during the first interval, the processor circuit 130 may determine whether the total number of times for performing the PLC operation(s) during the previous interval is higher than the value that may be equal to or different from the predetermined value TH2. In response to the total number of times higher than the value that may be equal to or different from the predetermined value TH2, the processor circuit 130 may keep the data utilized in the PLC operation, in order to increase the latency TL. Afterwards, the processor circuit 130 may setup the timer T2 in the memory circuit 140, in order to start counting for the predetermined interval PT3. Alternatively, in response to the total number of times not higher than the value that may be equal to or different from the predetermined value TH2, the processor circuit 130 may adjust the follow-up data in the data stream SD1, in order to not to increase the latency TL.

Accordingly, the processor circuit 130 may determine whether to increase the latency TL according to the transmission status obtained by operations in FIG. 2 (e.g., operation S310) and the total number times of PLC events occurred. In other words, the processor circuit 130 is able to adjust the latency TL in real time according to the current receiving status of the receiver circuit 110 and/or the transmission stability of the external signal source.

Reference is made to FIG. 3B, based on different triggering conditions, the processor circuit 130 may perform any of operations shown in FIG. 3B, in order to dynamically adjust the latency TL. In operation S350, if the predetermined interval PT3 is expired, the latency is decreased, and the timer for the predetermined interval PT3 is re-enabled (i.e., restart counting for the predetermined interval PT3). For example, in operation S320 or S340 in FIG. 3A, the timer T2 is setup. When the timer T2 is expired, if there is no other event (e.g., PLC event or the transmission status of the data stream SD1 is unstable), the processor circuit 130 may decrease the latency TL, and re-setup the timer T2, in order to start counting for the predetermined interval PT3 again. As a result, if the predetermined interval PT3 is expired and there is no other event, the processor circuit 130 may perform operation S350 again to decrease the latency TL step by step.

In operation S355, if the transmission status of the data stream is stable, the latency is decreased, and the timer for the predetermined interval PT3 is re-enabled (i.e., re-start counting for the predetermined interval PT3). For example, in operation S310 of FIG. 3A, the processor circuit 130 determines that the transmission status of the data stream SD1 is unstable. In the following operations, if the processor circuit 130 determines that the transmission status of the data stream SD1 becomes stable with operations in FIG. 2, the processor circuit 130 may decrease the latency TL and re-setup the timer T2, in order to start counting for the predetermined interval PT3 again. As a result, if the predetermined interval PT3 is expired and there is no other event, the processor circuit 130 may perform operation S350 again to decrease the latency TL step by step. In some embodiments, before the processor circuit 130 decreases the latency TL and re-setups the timer T2, the processor circuit 130 checks whether the current latency TL is within an initial range.

In operation S360, if the transmission status of the data stream is unstable, the timer for the predetermined interval PT3 is disabled (i.e., stop counting for the predetermined interval PT3). For example, the processor circuit 130 may determine that the transmission status of the data stream SD1 becomes unstable in the course of decreasing the latency TL. Under this condition, if the processor circuit 130 determines that the memory circuit 140 stores the timer T2, the processor circuit 130 may delete the timer T2, in order to stop counting for the predetermined interval PT3. As a result, the processor circuit 130 may instantly perform operation S310 in FIG. 3A again, in order to determine whether to adjust the latency TL.

The above description of the latency adjustment method 300 includes exemplary operations, but the operations of the latency adjustment method 300 are not necessarily performed in the order described above. Operations of the latency adjustment method 300 can be added, replaced, changed order, and/or eliminated, or the operations of the latency adjustment method 300 can be executed simultaneously or partially simultaneously as appropriate, in accordance with the spirit and scope of various embodiments of the present disclosure.

As described above, the data stream processing device and the latency adjustment method provided in some embodiments of the present disclosure are able to adjust the latency of the data stream in real time according to the transmission status of the current data stream and the number of PLC events. As a result, the interruption of the data stream is avoided, and the latency can be increased or decreased instantly to improve users' experience.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A latency adjustment method, comprising:
    in response to a predetermined event of a data stream occurred during a first interval, performing a transmission status determining operation to determine whether a transmission status of the data stream is stable;
    in response the transmission status being stable, determining whether a total number of times of packet loss compensation events of the data stream occurred during a previous interval is higher than a first predetermined value; and
    in response to the transmission status being unstable or the total number of times being higher than the first predetermined value, increasing a latency of the data stream,
    wherein performing the transmission status determining operation to determine whether the transmission status of the data stream is stable comprises:
    checking a short-term variation of the data stream with a long-term variation of the data stream in response to a comparison result of a standard score of the data stream and a second predetermined value, in order to determine whether the transmission status of the data stream is stable, wherein a number of data covered by the short-term variation is less than a number of data covered by the long-term variation.

2. The latency adjustment method of claim 1, further comprising:
    if the predetermined event of the data stream is not occurred during the first interval, determining whether the total number of times is higher than a value that is equal to or different from the first predetermined value.

3. The latency adjustment method of claim 1, wherein increasing the latency of the data stream comprises:
    in response to the total number of times being higher than the first predetermined value or a value different from the first predetermined value, increasing the latency of the data stream and starting counting for a predetermined interval; and
    in response to the transmission status being unstable, stopping counting for the predetermined interval.

4. The latency adjustment method of claim 3, further comprising:

if the transmission status of the data stream is stable or the predetermined interval is expired, decreasing the latency and re-starting counting for the predetermined interval; and
    if the transmission status of the data stream is unstable, stopping counting for the predetermined interval.

5. The latency adjustment method of claim 1, wherein the latency is not increased in response to the total number of times being not higher than the first predetermined value or a value different from the first predetermined value.

6. The latency adjustment method of claim 1, wherein checking the short-term variation of the data stream with the long-term variation of the data stream in response to the comparison result of the standard score of the data stream and the second predetermined value, in order to determine whether the transmission status of the data stream is stable comprises:
    comparing the standard score of the data stream with the second predetermined value;
    if the standard score is not higher than the second predetermined value, determining whether the short-term variation of the data stream is lower than the long-term variation of the data stream;
    if the short-term variation is lower than the long-term variation, starting counting for a first predetermined interval;
    if the standard score is not higher than the second predetermined value before the first predetermined interval is expired, determining that the transmission status is stable; and
    if the standard score is higher than the second predetermined value, determining that the transmission status is unstable.

7. The latency adjustment method of claim 6, wherein if the transmission status is unstable, the standard score is not compared with the second predetermined value during a second interval, and the latency adjustment method further comprises:
    stopping counting for an interval that is equal to or different from the first predetermined interval when the second interval is expired.

8. The latency adjustment method of claim 1, wherein the predetermined event comprises a predetermined number of packet loss compensation events.

9. A data stream processing device, comprising:
    a memory circuit configured to store at least one program code; and
    a processor circuit configured to execute the at least one program code in the memory circuit to:
        in response to a predetermined event of a data stream occurred during a first interval, perform a transmission status determining operation to check a short-term variation of the data stream with a long-term variation of the data stream in response to a comparison result of a standard score of the data stream and a second predetermined value, in order to determine whether a transmission status of the data stream is stable, wherein a number of data covered by the short-term variation is less than a number of data covered by the long-term variation;
        in response the transmission status being stable, determine whether a total number of times of packet loss compensation events of the data stream occurred during a previous interval is higher than a first predetermined value; and in response to the transmission status being unstable or the total number of times being higher than the first predetermined value, increase a latency of the data stream.

10. The data stream processing device of claim 9, wherein if the predetermined event of the data stream is not occurred during the first interval, the processor circuit is further configured to determine whether the total number of times is higher than a value that is equal to or different from the first predetermined value.

11. The data stream processing device of claim 9, wherein the processor circuit is configured to increase the latency of the data stream and start counting for a predetermined interval in response to the total number of times being higher than the first predetermined value or a value different from the first predetermined value, and stop counting for the predetermined interval in response to the transmission status being unstable.

12. The data stream processing device of claim 11, wherein if the transmission status of the data stream is stable or the predetermined interval is expired, the processor circuit is configured to decrease the latency and re-start counting for the predetermined interval.

13. The data stream processing device of claim 12, wherein if the transmission status of the data stream is unstable, the processor circuit is further configured to stop counting for the predetermined interval.

14. The data stream processing device of claim 9, wherein the processor circuit is configured to not increase the latency in response to the total number of times being not higher than a value that is equal to or different from the first predetermined value.

15. The data stream processing device of claim 9, wherein the processor circuit is configured to:
   compare the standard score of the data stream with the second predetermined value;
   if the standard score is not higher than the second predetermined value, determine whether the short-term variation of the data stream is lower than the long-term variation of the data stream;
   if the short-term variation is lower than the long-term variation, start counting for a first predetermined interval;
   if the standard score is not higher than the second predetermined value before the first predetermined interval is expired, determine that the transmission status is stable; and
   if the standard score is higher than the second predetermined value, determine that the transmission status is unstable.

16. The data stream processing device of claim 15, wherein the processor circuit is further configured to not compare the standard score with the second predetermined value during a second interval if the transmission status is unstable, and stop counting for an interval that is equal to or different from the first predetermined interval when the second interval is expired.

17. The data stream processing device of claim 9, wherein the predetermined event comprises a predetermined number of packet loss compensation events.

* * * * *